United States Patent
Reynolds

[15] 3,655,268
[45] Apr. 11, 1972

[54] LASER BEAM ATTENUATOR

[72] Inventor: Richard S. Reynolds, Mountain View, Calif.

[73] Assignee: Sylvania Electric Products Inc.

[22] Filed: June 1, 1970

[21] Appl. No.: 41,900

[52] U.S. Cl. ............................... 350/152, 350/147, 350/159
[51] Int. Cl. ............................................. G02b 27/28
[58] Field of Search ....................... 350/147, 152, 159, 160; 331/94.5

[56] References Cited

UNITED STATES PATENTS 3,439,968   4/1969   Hansen et al. ..................... 350/152

OTHER PUBLICATIONS

Abrams et al., "A Variable 10.6-$\mu$ Attenuator" IEEE J. Quant. Electronics Vol. QE-5, No. 4 (April 1969) pp. 212-213
Gerritsen, "Infrared Polarizer" RCA Tech. Notes TN No. 608 (March, 1965)

*Primary Examiner*—David Schonberg
*Assistant Examiner*—Paul R. Miller
*Attorney*—Norman J. O'Malley, Russell A. Cannon and John F. Lawler

[57] ABSTRACT

This attenuator comprises a pair of axially aligned anti-parallel Brewster angle windows that are rigidly secured in a cylindrical adjustment tube that is rotatably secured in a mounting tube. The attenuation of a linearly polarized laser beam that is incident along the axis of the attenuator is continuously varied from a minimum to a maximum value by rotating the adjustment tube relative to the mounting tube over a 90° angle.

2 Claims, 2 Drawing Figures

Patented April 11, 1972

3,655,268

INVENTOR.
RICHARD S. REYNOLDS

BY Russell A. Cannon

AGENT

LASER BEAM ATTENUATOR

BACKGROUND OF INVENTION

This invention relates to optical attenuators and more particularly to a device for attenuating a polarized laser beam.

It is desirable to be able to selectively control the power in a laser beam. One technique for accomplishing this is to vary the degree of laser excitation. In a gas laser, for example, the tube current can be adjusted to effect a change in laser beam power. This technique is unattractive since it generally provides only a limited power variation and is accompanied by a change in the operating frequency of the laser. Another prior art technique for controlling the laser beam power is to place a fixed value absorber in the path of the laser beam. This is difficult to accomplish safely in an operating high power laser system and provides only stepwise control of the laser power.

An object of this invention is the provision of an optical attenuator for selectively providing continuously variable attenuation of a polarized laser beam without changing the laser excitation level.

SUMMARY OF INVENTION

In accordance with this invention, a pair of axially aligned anti-parallel Brewster angle windows are simultaneously rotated about the axis to continuously vary the attenuation of a linearly polarized laser beam incident along the axis.

DESCRIPTION OF PREFERRED EMBODIMENT

Figure 1:
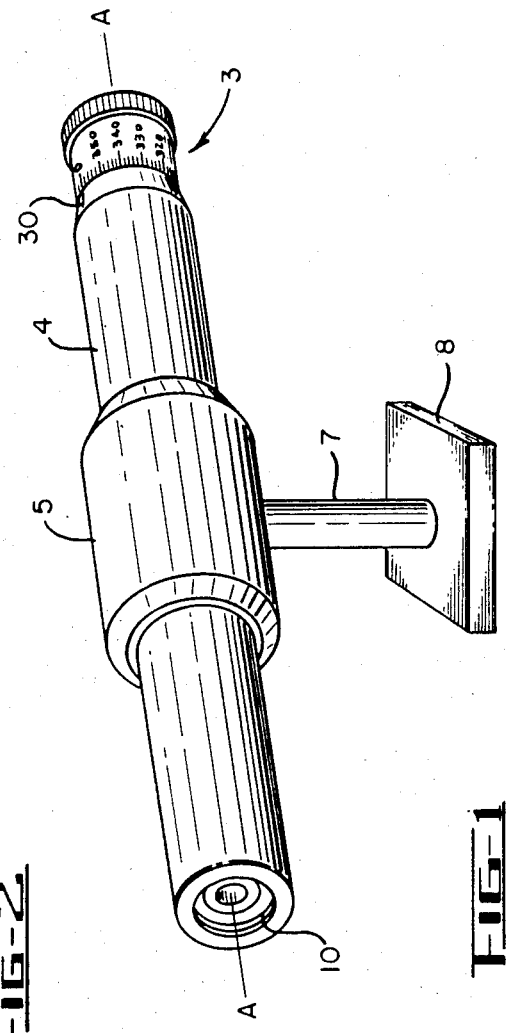
FIG. 1 is a perspective view of an optical attenuator embodying this invention.

Referring now to FIG. 1, an attenuator embodying this invention comprises an adjustment tube assembly 3 rotatably secured in a mounting tube 4. A cylindrical bench mount 5 is aligned over the center of gravity of the attenuator and is rigidly secured to the tube 4 by a set screw (not shown) in the threaded aperture 6 (see FIG. 2). This attenuator may be mounted on a workbench by screwing the threaded rod 7 of a stand 8 into the threaded aperture 9, see FIG. 2, of the bench mount. Alternatively, the attenuator may be mounted by screwing the threaded end 10 of tube 4 onto the end of a laser (not shown).

Figure 2:
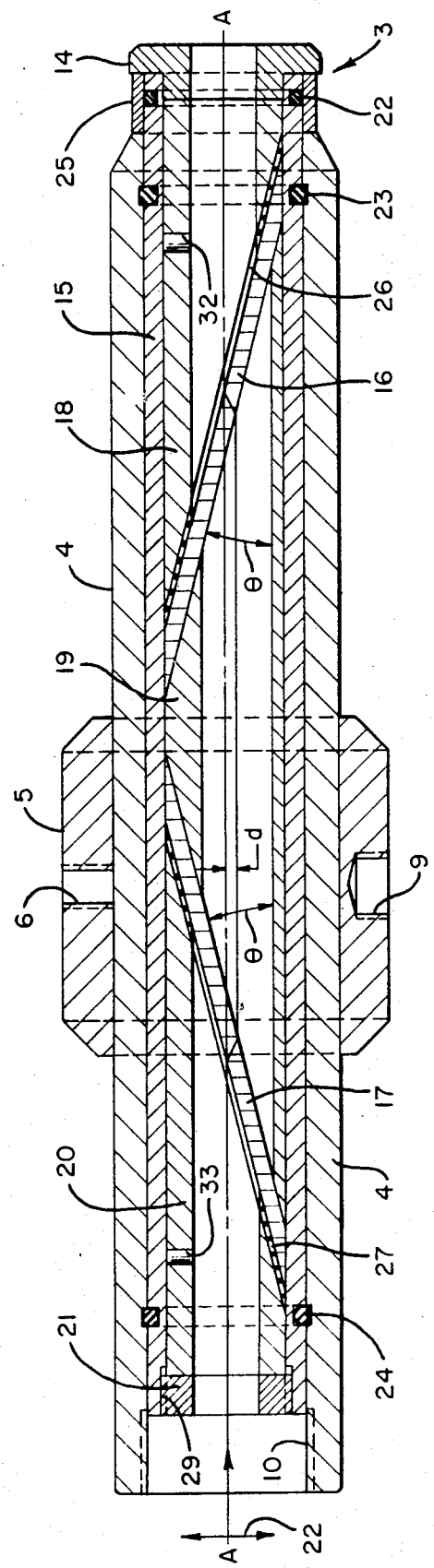
FIG. 2 is an enlarged section view of the optical attenuator in FIG. 1 taken along the longitudinal axis A—A thereof.

Referring now to the enlarged section view of the attenuator in FIG. 2, the adjustment tube assembly 3 comprises an adjustment knob 14 which is press fitted into one end of a cylindrical adjustment tube 15; a pair of Brewster angle windows 16 and 17; cylindrical spacers 18, 19 and 20 for holding the windows in tube 15; and, a cylindrical lock nut 21. Windows 16 and 17 are each oriented to make the Brewster angle 90°−θ with respect to the longitudinal axis A—A, to be anti-parallel, and to have parallel planes of incidence for a laser beam incident along the axis. The planes of incidence are defined as the planes formed by the axis A—A and the normals to windows 16 and 17 at the points of incidence. The windows are preferably made of the same material, have the same thickness, are made of a material having low absorption of light at the operating wavelength of the attenuator, have an index of refraction which is relatively constant as a function of wavelength over the operating wavelength band of the attenuator, and have a high index of refraction for providing maximum reflection of an incident polarized laser beam when the Brewster angle windows are rotated 90° with respect to the orientation illustrated in FIG. 2. By way of example, the windows may be made of germanium or gallium arsenide. The windows are oriented at the Brewster angle 90°−θ with respect to the axis in order to refract all of the light in an incident laser beam which is linearly polarized parallel to the plane of incidence, i.e., in the direction represented by the arrow 22. In this instance there is no reflection of the laser beam.

The spacers 18–20 are black bodies at the operating frequency of the attenuator for absorbing light reflected by the windows. In a preferred embodiment of the attenuator, the spacers are made of anodized aluminum. Spacers 18 and 20 are formed by boring through an aluminum rod an aperture that is coaxial with the rod axis and then cutting the resulting tube at an angle θ with respect to the tube axis. The spacer 19 is formed by boring through an aluminum rod an aperture along an axis that is parallel to but spaced from the rod axis by an amount equal to the displacement experienced by a light beam traveling through one of the windows 16 and 17. The ends of the resulting tube are then cut at the angle θ with respect to the rod axis such that the resulting ends thereof are anti-parallel. The spacers are anodized such that they absorb light.

The adjustment tube assembly 3 is assembled by sliding "O" rings 22, 23 and 24 into the associated cylindrical recesses in the circumference of tube 15, sliding a sleeve dial 25 over the "O" ring 22, and press fitting knob 14 into the one end of tube 15. Elliptically shaped washers or gaskets 26 and 27 are secured lightly to the faces of windows 16 and 17, respectively, which are in turn secured to opposite ends of spacer 19. The spacers 18–20 are next inserted into the bore of tube 15 and rigidly secured there by lock nut 21 which is screwed into the threaded end 29 of tube 15. The adjustment tube assembly 3 is then inserted into tube 4 until the "O" rings 23 and 24 slip into the associated cylindrical recesses in the bore of the mounting tube. The gaskets 26 and 27 are employed to keep moisture out of the assembly and to allow for thermal expansion of the windows. The dial 25 is marked in degrees to indicate the magnitude of the rotation of assembly 3 with respect to the stationary tube 4, and thus the rotation of windows 16 and 17. The dial is preferably set so that the '0' degree marking is aligned with the reference marker 30 in FIG. 1 when the windows are oriented as shown in FIG. 2. A probe tool may be inserted in holes 32 and 33 in spacers 18 and 20 to facilitate disassembly of the attenuator.

Consider that a laser beam linearly polarized in the direction represented by arrow 22 (i.e., in the plane of the paper) is incident on the attenuator along the axis. Since the light in the laser beam is polarized parallel to the planes of incidence and is incident on window 17 at the angle θ, substantially all of the light in the laser beam is refracted by window 17. More specifically, none of the incident laser light is reflected by window 17. It is all transmitted by the window, although it is displaced a distance d from the axis by transmission through window 17. Since window 16 is also oriented at the angle θ with respect to the axis and is anti-parallel to window 17, all of the light in the laser beam is also transmitted through window 16 (i.e., there is no reflection). The laser beam is also displaced the distance d by refraction through window 16, however, which causes the output laser beam to again be coincident with the axis A. Thus, it is seen that by using two anti-parallel windows of the same material and thickness the laser beams into and from the attenuator are maintained coincident with the axis A—A.

In order to attenuate the incident laser beam, the adjustment knob 14 and thus adjustment tube assembly 3 including windows 16 and 17 and the planes of incidence are rotated from the orientation illustrated in FIG. 2. This presents a condition in which all of the incident light is no longer parallel to the planes of incidence. The components of the incident light which are parallel to the planes of incidence are refracted and transmitted through the windows as described above. The components of the incident light that are perpendicular to the planes of incidence, however, are reflected at the surfaces of windows 16 and 17 and absorbed by the anodized spacers. As the assembly 3 is rotated between 0° and 90° from the orientation illustrated in FIG. 2, the attenuation of an incident laser beam varies continuously, although non-linearly, from a minimum to a maximum value. The minimum value of attenuation provided is a function of the residual absorption of light by the windows and is a limiting factor on the amount of power that may be applied to the attenuator. The transmission and attenuation provided at several angles of rotation of the assembly 3 are listed below:

| Degrees | Transmission(%) | Attenuation (db) |
|---|---|---|
| 0 | 95 | −0.22 |
| 15 | 88 | −0.56 |
| 30 | 73 | −1.37 |
| 45 | 54 | −2.68 |
| 60 | 26 | −5.85 |
| 75 | 8 | −10.9 |
| 90 | 1 | −20.0 |

The transmission provided by the attenuator is defined as the ratio of the input power to the attenuator to the output power of the attenuator. The attenuation provided by the attenuator in decibels (db) is defined as 10 times the logarithm of the transmission.

An attenuator embodying this invention that was actually built and tested had the following dimensions ad characteristics:

| | |
|---|---|
| Windows 16, 17 | |
| Material | Germanium |
| Thickness | 0.060 inch |
| Index of Refraction at 10.6μ | 4.0 |
| Brewster Angle (90°−θ) | 72° |
| Bore Diameter | |
| Spacer 19 | 0.40 inch |
| Spacer 20 | 0.40 inch |
| Overall Length | 8.5 inches |
| Tube 4 Outer Diameter | 1.375 inches |
| Weight | 2 pounds |
| Operating Wavelength | 2μ-20μ |
| Laser Beam Wavelength (nominal) | 10.6μ |
| Insertion Loss | 5% |
| Attenuation (maximum) | −20 db |
| Incident Power | 10 watts |

The transmission provided by this attenuator may be squared by doubling the number of windows, although this also causes the residual absorption of the attenuator to increase. Also, the attenuation at any rotation angle may be increased or decreased by fabricating the windows of a material having a higher or lower, respectively, index of refraction.

What is claimed is:

1. Apparatus for attenuating a linearly polarized laser light beam incident along an axis comprising
    a first optically transparent window oriented at the complement of Brewster's angle with respect to the axis,
    a second optically transparent Brewster angle window having the same index of refraction and the same thickness as said first window, said first and second windows being axially aligned along the axis such that they are anti-parallel and have parallel planes of incidence,
    means for simultaneously rotating both of said windows about said axis comprising
        a mounting tube,
        an adjustment tube rotatably supported in said mounting tube, and
    means for rigidly supporting said windows in said adjustment tube comprising
        first and second cylindrical support tubes each having one end thereof cut at the complement of the Brewster angle of said windows for supporting one face of each of said windows at the complement of the Brewster angle with respect to the axis, and
        a third cylindrical support tube having each end thereof cut at the complement of the Brewster angle of said windows such that the plane surfaces of the third tube ends are anti-parallel and define parallel planes of incidence with the longitudinal axis thereof, the ends of said third tube supporting the other faces of said windows at the complement of the Brewster angle with respect to the axis.--.

2. An adjustable laser beam attenuator comprising
    a cylindrical mounting tube having an axis,
    a cylindrical adjustment tube coaxially disposed within and rotatable with respect to said mounting tube about said axis,
    first and second axially spaced optically transparent flat windows rotatable with and spaced inwardly from opposite ends of said adjustment tube, said windows being anti-parallel and being disposed at the complement of Brewster's angle relative to said axis,
    cylindrical spacers coaxially disposed within said adjustment tube between said windows and opposite ends, respectively, of said adjustment tube, and
    a calibrated cylindrical knob mounted on one end of and rotatable with said adjustment tube for indicating angular displacement of said adjustment tube relative to said mounting tube,
    said spacers having inner cylindrical surfaces facing said windows and characterized by high optical absorptivity of light reflected from said windows.--.

* * * * *